United States Patent
Boyce

(10) Patent No.: US 7,543,185 B2
(45) Date of Patent: Jun. 2, 2009

(54) DEBUG SYSTEM WITH EVENT-BASED VIRTUAL PROCESSING AGENTS

(75) Inventor: Douglas G. Boyce, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 484 days.

(21) Appl. No.: 11/473,816

(22) Filed: Jun. 23, 2006

(65) Prior Publication Data

US 2008/0010544 A1 Jan. 10, 2008

(51) Int. Cl.
G06F 11/00 (2006.01)
(52) U.S. Cl. .............................. 714/32; 714/34; 714/35
(58) Field of Classification Search .................. 714/32, 714/34, 35
See application file for complete search history.

(56) References Cited

U.S. PATENT DOCUMENTS

| | | | |
|---|---|---|---|
| 6,077,312 A * | 6/2000 | Bates et al. ................. | 717/129 |
| 6,085,336 A * | 7/2000 | Swoboda et al. .............. | 714/30 |
| 6,557,116 B1* | 4/2003 | Swoboda et al. .............. | 714/28 |
| 6,567,933 B1* | 5/2003 | Swoboda et al. .............. | 714/31 |
| 6,857,084 B1* | 2/2005 | Giles ........................... | 714/35 |
| 2004/0103348 A1* | 5/2004 | Nardini et al. ................ | 714/34 |
| 2005/0034024 A1* | 2/2005 | Alverson et al. .............. | 714/38 |
| 2006/0085684 A1* | 4/2006 | Drori et al. ................... | 714/34 |
| 2006/0248394 A1* | 11/2006 | McGowan .................... | 714/30 |
| 2006/0259753 A1* | 11/2006 | Lell et al. ...................... | 713/1 |
| 2007/0214389 A1* | 9/2007 | Severson et al. .............. | 714/30 |

* cited by examiner

Primary Examiner—Marc Duncan
(74) Attorney, Agent, or Firm—Buckley, Maschoff & Talwalkar LLC

(57) ABSTRACT

Some aspects provide determination of a debug event, selection of a controller context based on the determined debug event, and execution of the selected controller context. The debug event may be associated with a microprocessor, and the controller context may be selected based on predetermined associations between a plurality of debug events and a plurality of controller contexts.

17 Claims, 6 Drawing Sheets

DEBUG SYSTEM WITH EVENT-BASED VIRTUAL PROCESSING AGENTS

BACKGROUND

A debug tool may be used to test functional silicon devices such as a Central Processing Unit (CPU) and an associated chipset that provides the CPU with I/O and memory. More specifically, a conventional debug tool may provide control, internal state visibility and observation of a limited set of signals that are of interest in view of particular code executing on the CPU. The debug tool may support one or more interfaces including these signals, such as a Joint Test Access Group (JTAG) interface and an interface to dedicated control pins (e.g., Probe Mode Break, Probe Mode Ready, etc.).

Conventional debug tools such as the In-Target Probe (ITP) tool implement specific logic and a software control package to manage the tool and to manage interactions between the tool and a System Under Test (SUT). As the number of supported use cases and interactions increases, either the complexity of the logic or the latencies between the software and the SUT increase exponentially. Both outcomes are undesirable, as increased logic complexity entails increased cost and increased latency results in instability in debug operation including but not limited to missing responses.

DETAILED DESCRIPTION

Figure 1:
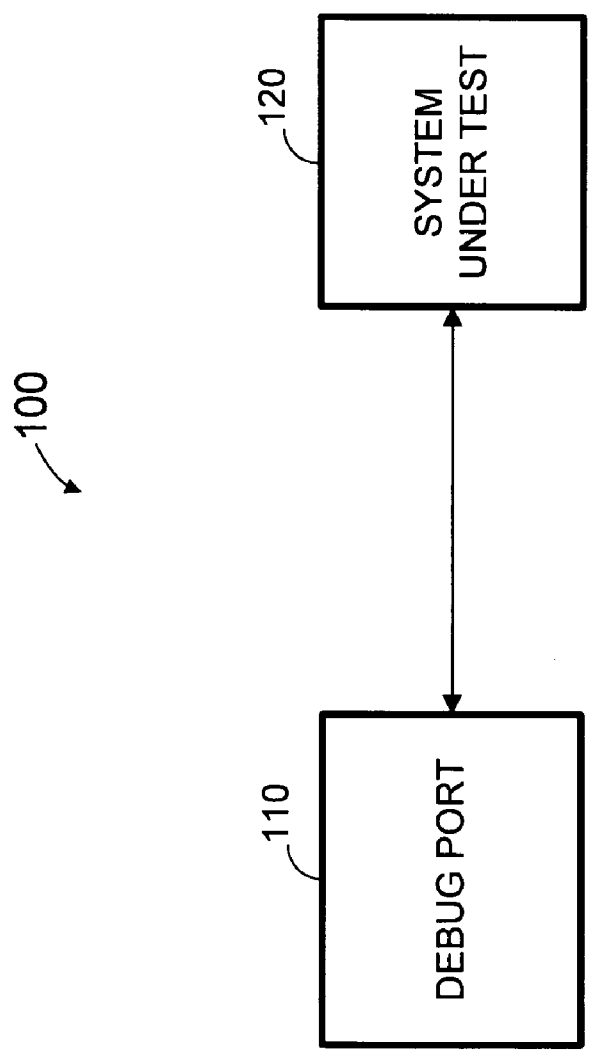
FIG. 1 is a diagram of a system according to some embodiments.

FIG. 1 is a block diagram of system 100 according to some embodiments. System 100 includes debug port 110 and system under test (SUT) 120. Debug port 110 may operate to debug and/or otherwise test SUT 120. In some embodiments, debug port 110 determines a debug event and selects a controller context based on the determined debug event. Debug port 110 then executes the selected controller context. Details of the foregoing process according to some embodiments will be provided below.

In some embodiments, debug port 110 comprises a programmable controller that implements "virtual processing agents" using a dedicated controller context that is associated with each virtual processing agent. In turn, each virtual processing agent/controller context may be associated with a specified set of SUT interactions or host interface tasks. Such associations according to some embodiments will be described below with respect to FIG. 3. Debug port 110 may comply with one or more design specifications associated with an ITP tool.

SUT 120 may comprise one or more processing devices, including but not limited to CPUs, processor cores, and chipsets. SUT 120 may also include a processing device such as a cache structure and an Arithmetic Logic Unit. According to some embodiments, SUT 120 includes internal mechanisms for monitoring states of SUT 120. Such mechanisms may comprise event monitoring logic and registers for implementing such event monitoring.

SUT 120 may include any number of features for facilitating testing thereof. For example, SUT 120 may allow debug port 110 to load patch code therein. The patch code may cause SUT 120 to report specific data to debug port 110 via an auxiliary port. SUT 120 may include JTAG scan chains that may be controlled by debug port 110 to shift data in and out of internal processing nodes of SUT 120.

Figure 2:
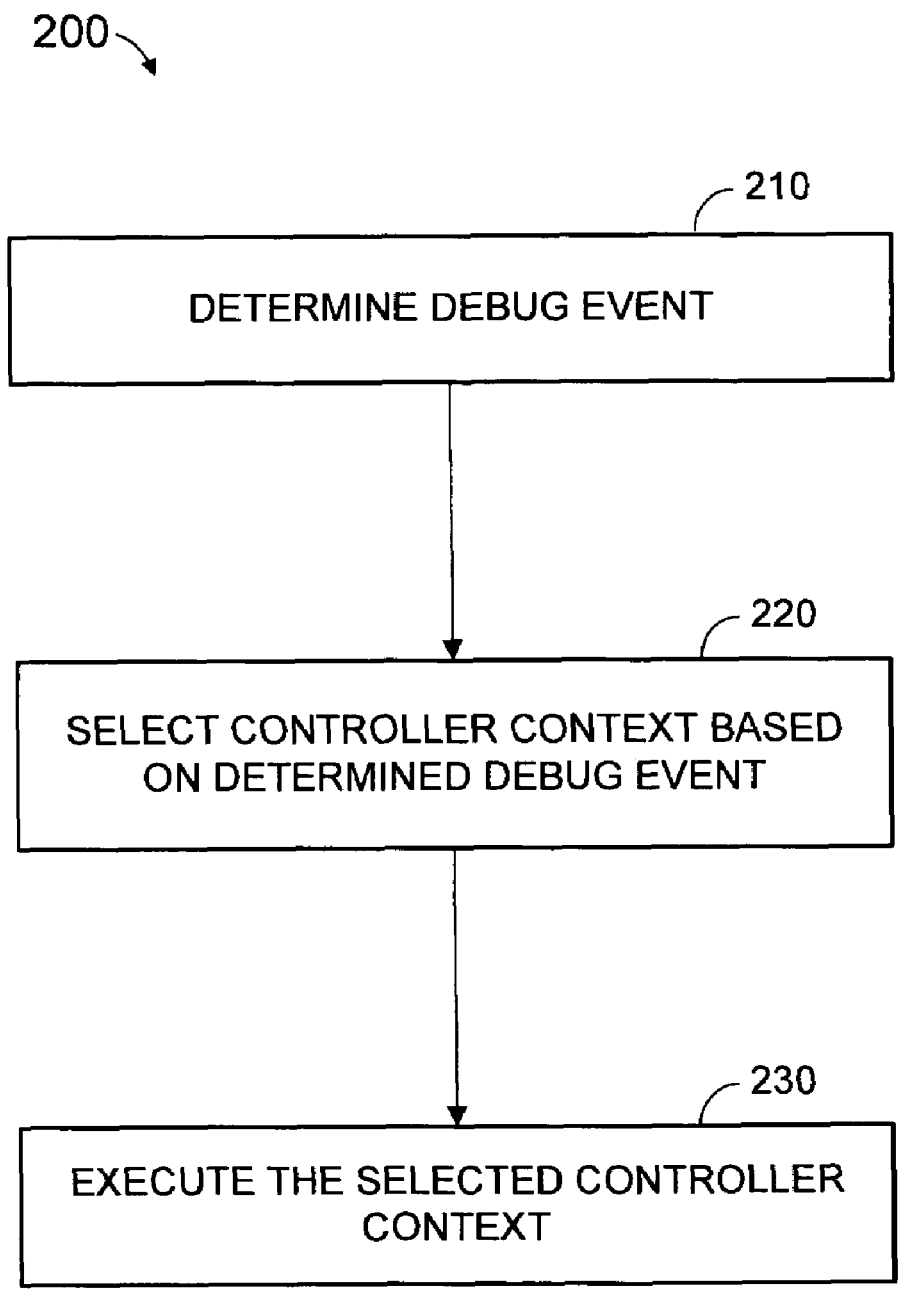
FIG. 2 is a flow diagram of a method according to some embodiments.

FIG. 2 is a general flow diagram of method 200 that may be performed by any suitable system according to some embodiments, including but not limited to debug port 110. Method 200 may therefore be performed by any combination of hardware and/or software. Some embodiments of method 200 may be practiced in any order that is practicable.

Initially, a debug event is determined at 210. The debug event may have occurred, or may be impending, within an SUT, an interface to a host system, a debug tool, or any other hardware or software. In some embodiments, the debug event is determined by programmable hardware of a debug port controller (e.g., a Field Programmable Gate Array Integrated Circuit).

A controller context is selected based on the determined debug event at 220. According to some embodiments of 220, the aforementioned controller may support two or more controller contexts, each of which is associated with a virtual processing agent. The controller also maintains an index which associates each of several debug events with one controller context/virtual processing agent. Therefore, at 220, the controller selects a controller context that, according to the index, is associated with the determined debug event.

The selected controller context is executed at 230. Continuing with the foregoing example, the selected controller context is associated with a dedicated instruction stack. Accordingly, at 230, a next instruction in the instruction stack is executed. The instruction stack may include instructions that are related to the determined debug event, but embodiments are not limited thereto. Execution of the selected controller context may use the full address and data capabilities of the controller.

Some embodiments of process 200 may provide a firmware control agent exhibiting improved response to debug events and decreased code requirements.

Figure 3:
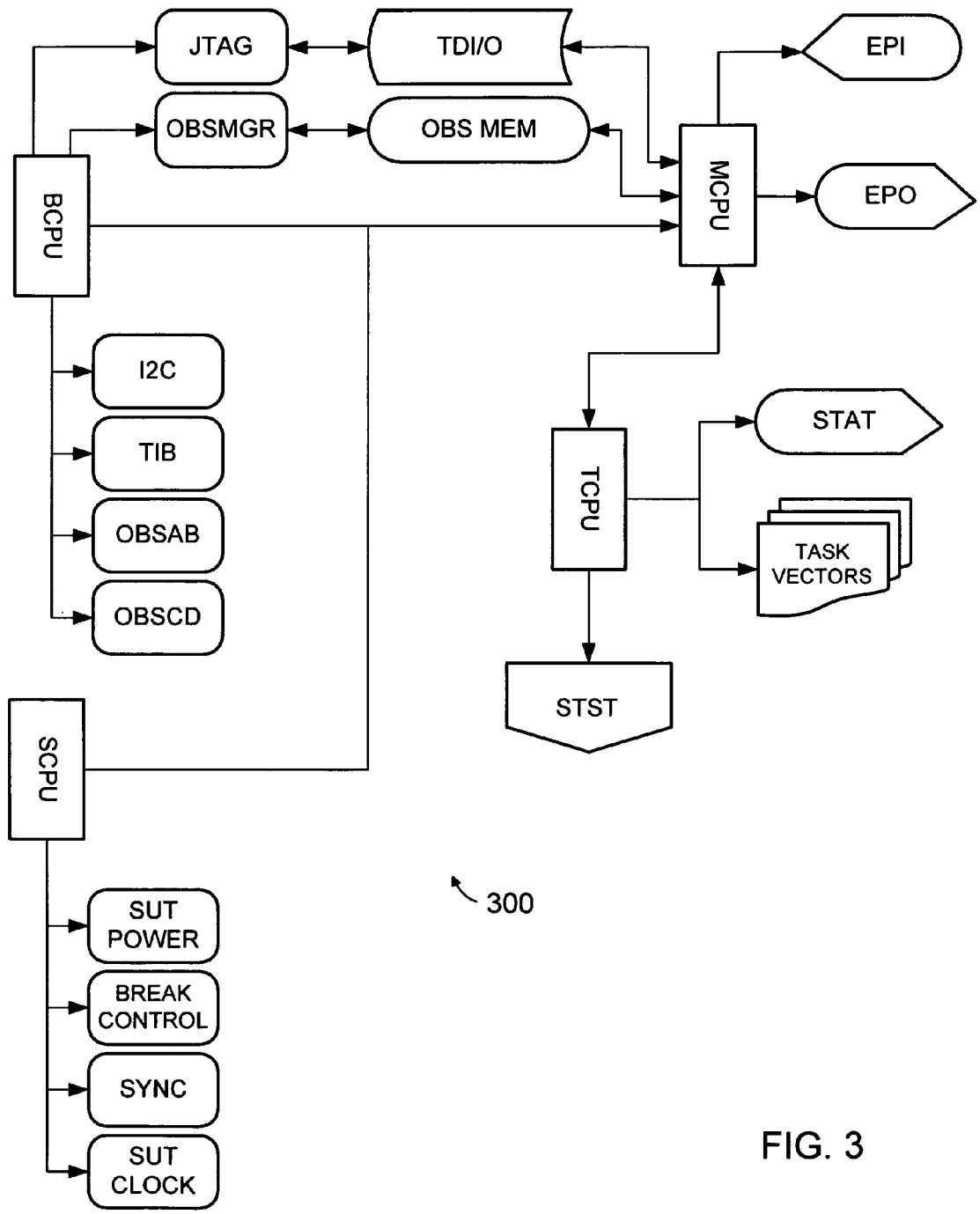
FIG. 3 is a control model according to some embodiments.

FIG. 3 illustrates control model 300 according to some embodiments. Debug port 110 of FIG. 1 may implement control model 300, and process 200 may be implemented by an apparatus that also implements control model 300. Of course, control model 300 may be implemented by systems other than those described herein.

Control model 300 provides four virtual processing agents for executing specific SUT and debug interface control tasks. In a case that control model 300 is implemented by a programmable controller, each agent may be implemented by a controller context and may separately and independently use the full address and data capabilities of the controller. According to some embodiments, machine code of such a controller is designed to set and clear control register bits needed to effect the SUT and debug interface control tasks, and to sleep otherwise.

The four virtual processing agents of control model 300, listed in order of execution priority (i.e., highest to lowest), are TCPU, SCPU, MCPU, and BCPU. According to some embodiments, TCPU services task allocation and status to a host system, SCPU services SUT state changes such as power and clock, MCPU services data transfers with the host system, and BCPU services basic tool interactions such as running JTAG operations in sequence with SUT issues. BCPU may comprise an element of kernel firmware, while SCPU may comprise an element of System Monitor firmware used to track SUT power, clock state, etc. according to some embodiments.

Figure 4:
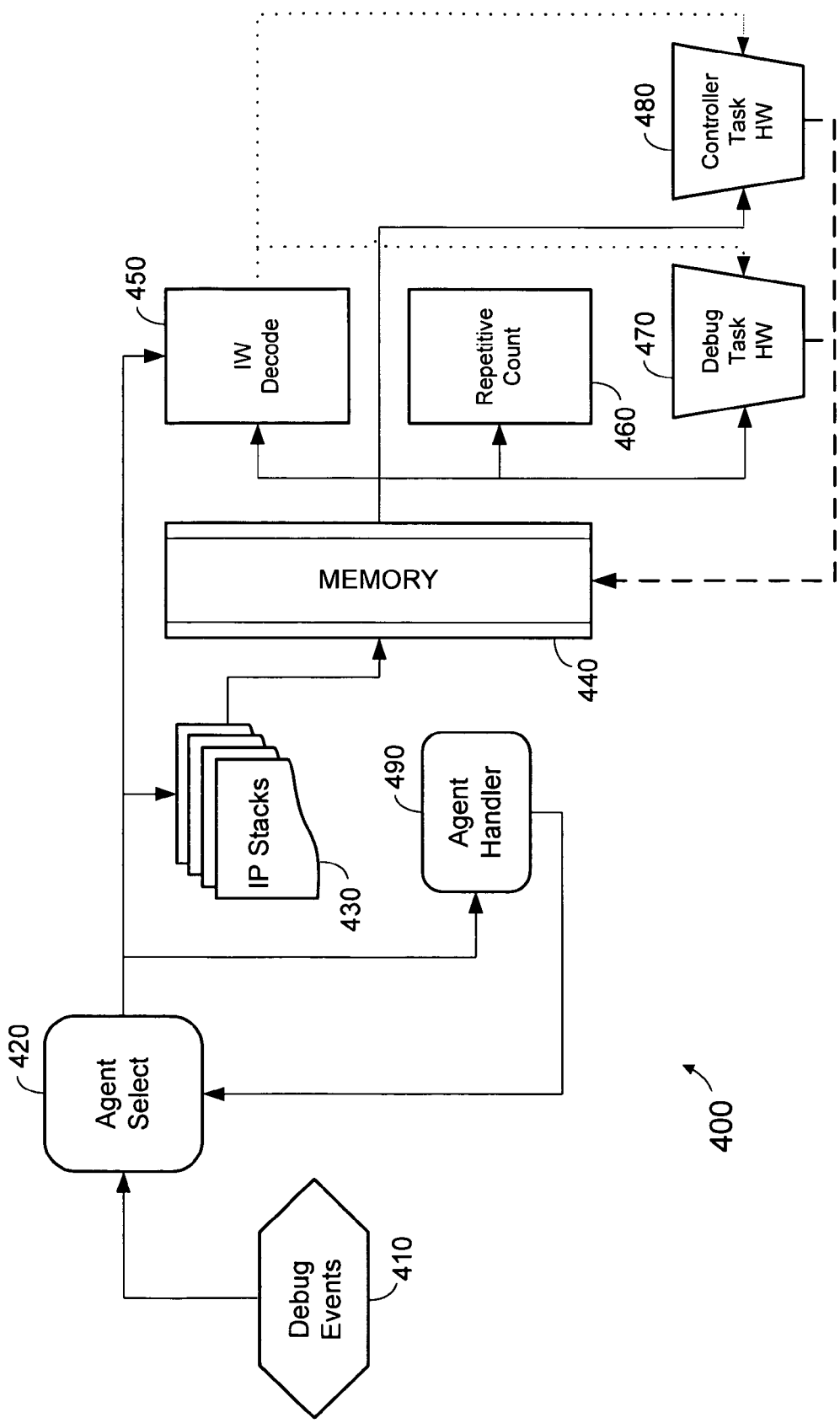
FIG. 4 is a functional block diagram of a system according to some embodiments.

FIG. 4 is a functional block diagram of system 400 according to some embodiments. System 400 may be implemented by debug port 110, may implement process 200, and/or may implement control model 300. According to some embodiments, system 400 is embodied in a programmable controller.

Debug events 410 comprises events that may be determined by system 400. As mentioned above, debug events may include SUT events, host interface events, or any other suitable events that may be determined by system 400. Agent select 420 determines a debug event and selects a virtual processing agent based thereon. The agent may comprise a controller context that is associated with one or more debug events. Agent select 420 may comprise an event decoding tree that includes the associations between several controller contexts and their debug events.

Instruction pointer stacks 430 include an instruction pointer stack for each virtual processing agent/controller context. Accordingly, once a virtual processing agent is selected by agent select 420, a next instruction pointer is determined from its associated instruction pointer stack 430. The determined instruction pointer points to a location of memory 440. Memory 440 may comprise any type of on-die or off-die memory.

Instruction word decode stack 450 fetches data from the location of memory 440. In some embodiments, the data includes an instruction word (e.g., machine code), a register address, and a repetitive count. Instruction word decode stack 450 may load repetitive count stack 460 with the repetitive count and operate in conjunction with debug task hardware 470 and CPU task hardware 480 to execute the fetched instruction. According to some embodiments, instruction word decode stack 450 and repetitive count stack 460 are capable of stacking four instruction words and four repetitive counts, respectively.

The selected virtual processing agent may automatically enter a sleep mode once no more data remains to be processed. In this regard, each virtual processing agent may enter the sleep mode in context so that an associated context need not be saved in a stack prior to sleep. As a result, each virtual processing agent may be ready to resume and to fetch an instruction upon waking.

Agent handler 490 may manage the above-described operation for each virtual processing agent. In some embodiments, the virtual processing agents operate in parallel. Agent handler 490 may also wake a virtual processing agent in response to a selection by agent select 420.

Figure 5:
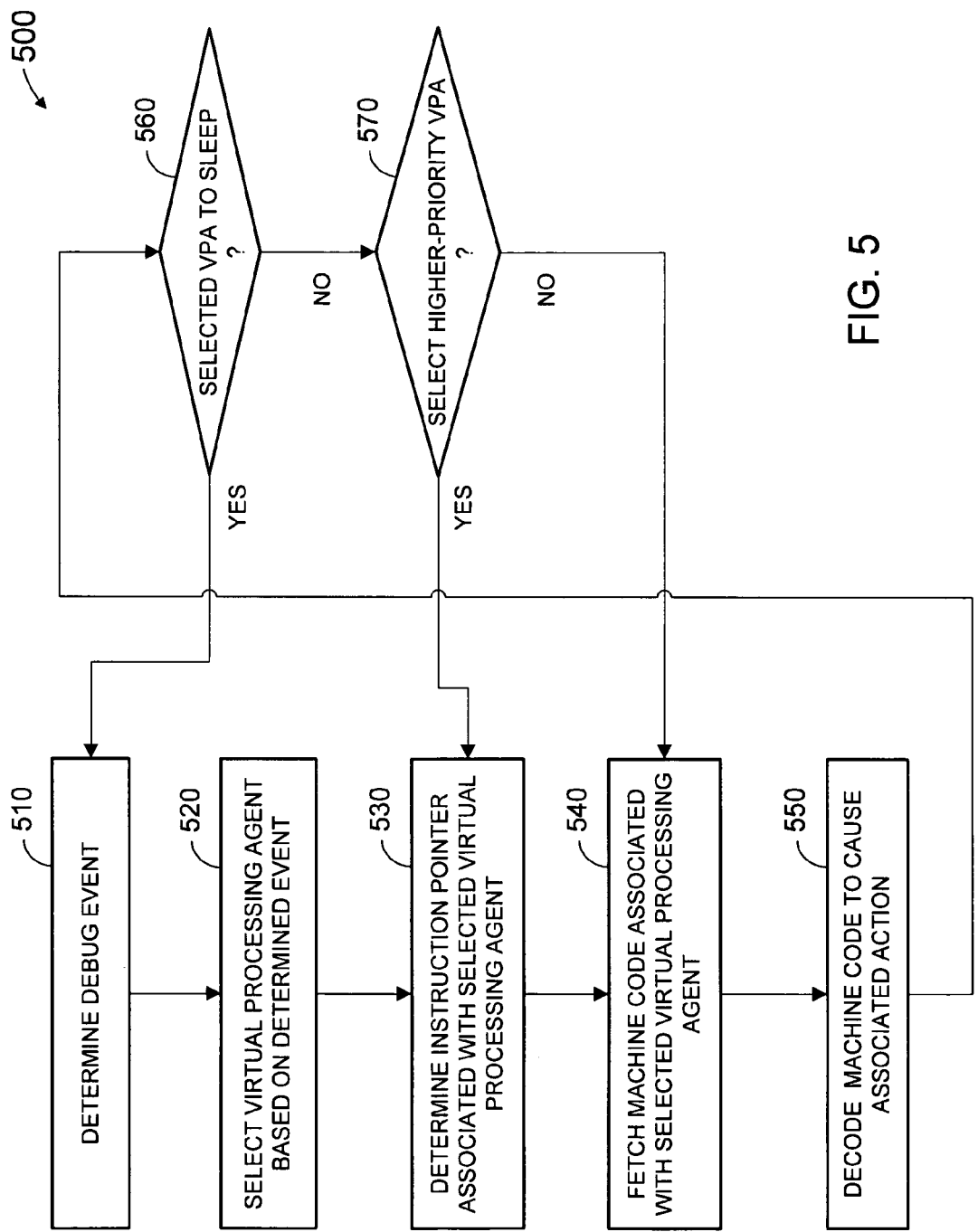
FIG. 5 is a flow diagram of a method according to some embodiments.

FIG. 5 is a flow diagram of process 500 according to some embodiments. Process 500 may be executed by any combination of hardware, firmware, and/or software. Process 500 may be executed by any system implementing debug port 110, model 300, and/or system 400. According to some embodiments, process 500 is executed by a controller of debug port 110.

A debug event is determined at 510. Referring to FIG. 4, the debug event may be determined by agent select 420 at 510. Next, at 520, a virtual processing agent is selected based on the determined debug event. Agent select 420, as described above, may comprise an event decoding tree that associates several virtual processing agents with predetermined debug events. Accordingly, at 520, agent select 420 may select a virtual processing agent that is associated with the determined debug event.

An instruction pointer associated with the selected virtual processing agent is determined at 530. The instruction pointer may be determined from an instruction pointer stack of instruction pointer stacks 430 that is associated with the selected virtual processing agent. The determined instruction pointer points to a location of memory 440, and machine code is fetched from the location at 540. Since the instruction pointer used to fetch the machine code is associated with the selected virtual processing agent, the machine code is also associated with the selected virtual processing agent. In some embodiments, instruction word decode stack 450 fetches the machine code from the location of memory 440.

Next, at 550, the machine code is decoded to cause an associated action. Continuing with the example of system 400, the machine code is fetched at 540 along with a register address and a repetitive count. Instruction word decode stack 450 loads repetitive count stack 460 with the repetitive count and operates in conjunction with debug task hardware 470 and CPU task hardware 480 to execute the fetched machine code. Any result of this execution may be stored at the fetched register address.

The selected virtual processing agent determines whether to sleep at 560. The determination may include a determination of whether any data is available on which the selected virtual processing agent should operate. If the virtual processing agent is to sleep, flow returns to 510 and continues as described above.

If not, flow continues to 570 to determine whether a higher-priority virtual processing agent should be selected. Agent handler 480, for example, may detect a debug event that is associated with a higher-priority virtual processing agent at 570. Accordingly, flow proceeds from 570 to 530 for selection of an instruction pointer associated with the higher-priority virtual processing agent.

If it is determined at 570 not to select a higher-priority virtual processing agent, flow returns to 540 to fetch machine code associated with the originally-selected virtual processing agent. This machine code may be located at a location adjacent to the location that was pointed to by the above-mentioned instruction pointer. If not, it may be necessary to determine a next instruction pointer from the instruction pointer stack associated with the originally-selected virtual processing agent.

Figure 6:
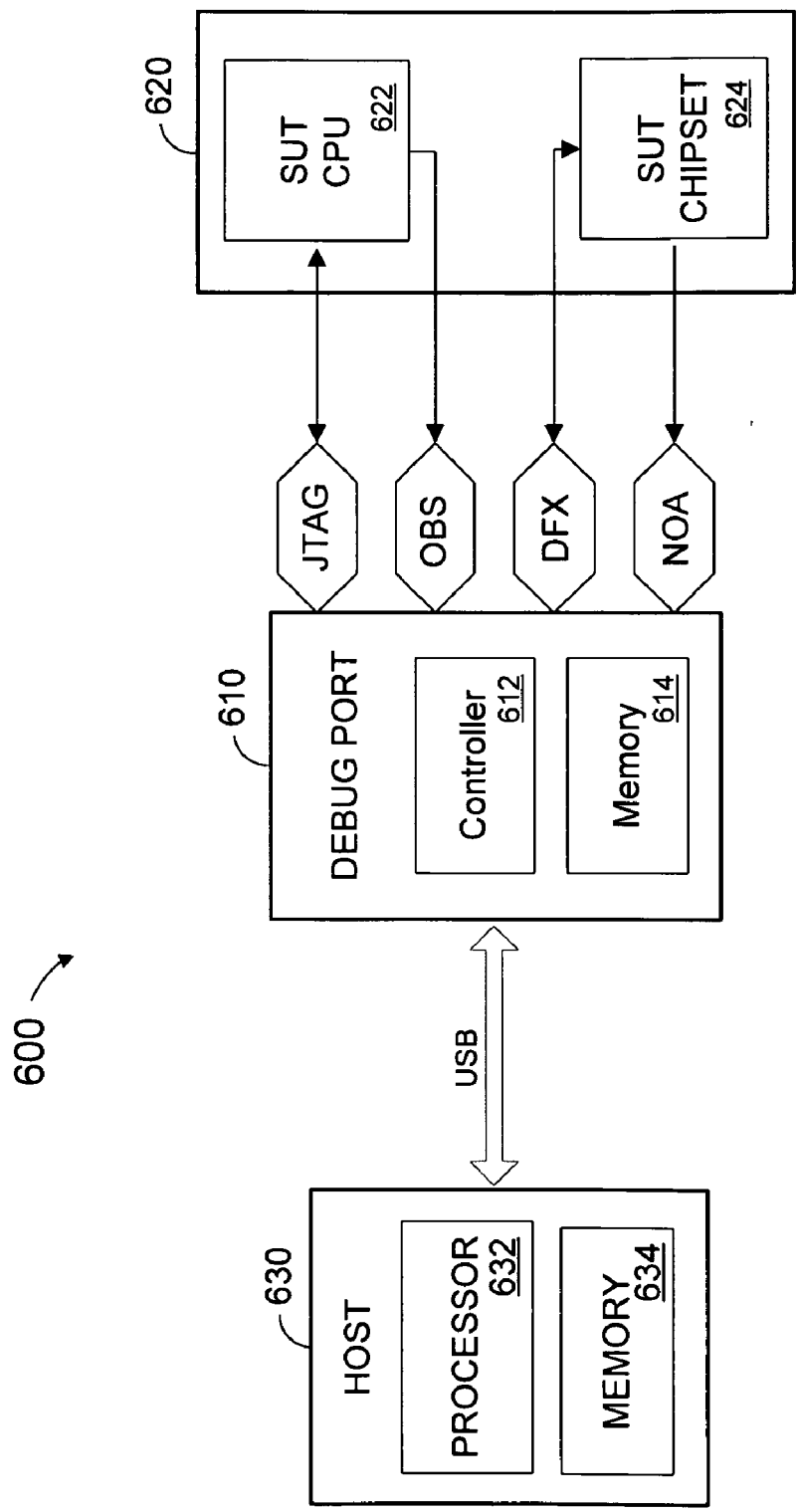
FIG. 6 is a block diagram of a system according to some embodiments.

FIG. 6 is a block diagram of system 600 according to some embodiments. System 600 includes debug port 610, SUT 620 and host 630. Debug port 610 includes controller 612 as described above and memory 614 storing firmware for execution by controller 612. The firmware may therefore embody any of the systems and methods described herein.

SUT 620 includes SUT CPU 622 and SUT chipset 624. As shown, debug port 610 interfaces with SUT CPU 622 via two interfaces and with SUT chipset 624 via two other interfaces. According to some embodiments, debug port 610 interfaces with host 630 via a Universal Serial Bus interface. Embodiments are not limited to the illustrated interfaces and configuration.

Host 630 may comprise a desktop computer or any other suitable system to control a debug/test procedure. Host 630 includes processor 632, which may comprise a Pentium®-class microprocessor in some embodiments, and memory 634, which may comprise any suitable memory element to store code for execution by processor 632. For example, memory 634 may store a testing application for use in conjunction with debug port 610.

The several embodiments described herein are solely for the purpose of illustration. Persons in the art will recognize from this description that other embodiments may be practiced with modifications and alterations limited only by the claims.

What is claimed is:

1. A method comprising:
   determining a debug event;
   selecting a controller context based on the determined debug event; and
   executing the selected controller context,
   wherein executing the selected controller context comprises determining whether the selected controller context is to enter a sleep mode, and
   wherein, if the selected controller context is to enter the sleep mode, the method further comprises:
   determining a second debug event;
   selecting a second controller context based on the determined debug event; and
   executing the selected second controller context.

2. A method according to claim 1, wherein executing the selected controller context comprises:
   determining an instruction pointer associated with the selected controller context;
   fetching machine code associated with the instruction pointer; and
   decoding the machine code.

3. A method according to claim 1, wherein executing the selected second controller context comprises:
   determining a second instruction pointer associated with the higher-priority controller context;
   fetching second machine code associated with the second instruction pointer; and
   decoding the second machine code.

4. A method according to claim 1, wherein executing the selected controller context comprises:
   determining an instruction pointer associated with the selected controller context;
   fetching machine code associated with the instruction pointer; and
   decoding the machine code, and
   wherein, if the selected controller context is to enter the sleep mode, the method further comprises:
   determining whether to select a higher-priority controller context;
   if a higher-priority controller context is to be selected, determining a second instruction pointer associated with the higher-priority controller context, fetching second machine code associated with the second instruction pointer, and decoding the second machine code; and
   if a higher-priority controller context is not to be selected, fetching third machine code associated with the instruction pointer, and decoding the third machine code.

5. A method according to claim 1, wherein executing the selected controller context further comprises:
   determining an instruction pointer associated with the selected controller context;
   fetching machine code associated with the instruction pointer;
   decoding the machine code;
   determining whether to select a higher-priority controller context;
   if a higher-priority controller context is to be selected, determining a second instruction pointer associated with the higher-priority controller context, fetching second machine code associated with the second instruction pointer, and decoding the second machine code; and
   if a higher-priority controller context is not to be selected, fetching third machine code associated with the instruction pointer, and decoding the third machine code.

6. A method according to claim 1, wherein selecting a controller context based on the determined debug event comprises:
   selecting the controller context based on predetermined associations between a plurality of debug events and a plurality of controller contexts.

7. An apparatus comprising:
   a memory storing executable code;
   a device to execute the code to:
   determine a debug event;
   select a controller context based on the determined debug event; and
   execute the selected controller context,
   wherein execution of the selected controller context comprises determination of whether the selected controller context is to enter a sleep mode, and
   wherein the device is further to execute the code to:
   determine, if the selected controller context is to enter the sleep mode, a second debug event;
   select a second controller context based on the determined debug event; and
   execute the selected second controller context.

8. An apparatus according to claim 7, wherein execution of the selected controller context comprises:
   determination of an instruction pointer associated with the selected controller context;
   fetching of machine code associated with the instruction pointer; and
   decoding of the machine code.

9. An apparatus according to claim 7, wherein execution of the selected second controller context comprises:
   determination of a second instruction pointer associated with the higher-priority controller context;
   fetching of second machine code associated with the second instruction pointer; and
   decoding of the second machine code.

10. An apparatus according to claim 7, wherein execution of the selected controller context comprises:
    determination of an instruction pointer associated with the selected controller context;
    fetching of machine code associated with the instruction pointer; and
    decoding of the machine code, and
    wherein, if the selected controller context is to enter the sleep mode, the device is further to execute the code to:
    determine whether to select a higher-priority controller context;
    if a higher-priority controller context is to be selected, determine a second instruction pointer associated with the higher-priority controller context, fetch second machine code associated with the second instruction pointer, and decode the second machine code; and
    if a higher-priority controller context is not to be selected, fetch third machine code associated with the instruction pointer, and decode the third machine code.

11. An apparatus according to claim 7, wherein execution of the selected controller context further comprises:
    determination of an instruction pointer associated with the selected controller context;
    fetching of machine code associated with the instruction pointer;
    decoding of the machine code;
    determination of whether to select a higher-priority controller context;

if a higher-priority controller context is to be selected, determination of a second instruction pointer associated with the higher-priority controller context, fetching of second machine code associated with the second instruction pointer, and decoding of the second machine code; and if a higher-priority controller context is not to be selected, fetching of third machine code associated with the instruction pointer, and decoding of the third machine code.

12. An apparatus according to claim 7, wherein selection of a controller context based on the determined debug event comprises:

selection of the controller context based on predetermined associations between a plurality of debug events and a plurality of controller contexts.

13. A system comprising:

a microprocessor under test;

a memory storing executable code; and a controller to execute the code to:

determine a debug event associated with the microprocessor;

select a controller context based on the determined debug event; and execute the selected controller context, wherein execution of the selected controller context comprises determination of whether the selected controller context is to enter a sleep mode, and wherein the device is further to execute the code to:

determine, if the selected controller context is to enter the sleep mode, a second debug event;

select a second controller context based on the determined debug event; and execute the selected second controller context.

14. A system according to claim 13, wherein execution of the selected second controller context comprises:

determination of a second instruction pointer associated with the higher-priority controller context;

fetching of second machine code associated with the second instruction pointer; and decoding of the second machine code.

15. A system according to claim 13, wherein execution of the selected controller context comprises:

determination of an instruction pointer associated with the selected controller context;

fetching of machine code associated with the instruction pointer; and decoding of the machine code, and wherein, if the selected controller context is to enter the sleep mode, the device is further to execute the code to:

determine whether to select a higher-priority controller context;

if a higher-priority controller context is to be selected, determine a second instruction pointer associated with the higher-priority controller context, fetch second machine code associated with the second instruction pointer, and decode the second machine code; and if a higher-priority controller context is not to be selected, fetch third machine code associated with the instruction pointer, and decode the third machine code.

16. A system according to claim 13, wherein execution of the selected controller context further comprises:

determination of an instruction pointer associated with the selected controller context;

fetching of machine code associated with the instruction pointer;

decoding of the machine code;

determination of whether to select a higher-priority controller context;

if a higher-priority controller context is to be selected, determination of a second instruction pointer associated with the higher-priority controller context, fetching of second machine code associated with the second instruction pointer, and decoding of the second machine code; and if a higher-priority controller context is not to be selected, fetching of third machine code associated with the instruction pointer, and decoding of the third machine code.

17. A system according to claim 13, wherein selection of a controller context based on the determined debug event comprises:

selection of the controller context based on predetermined associations between a plurality of debug events and a plurality of controller contexts.

* * * * *